United States Patent [19]
Long et al.

[11] Patent Number: 5,563,766
[45] Date of Patent: Oct. 8, 1996

[54] MOUNTING ASSEMBLY FOR A SMOKE ALARM

[75] Inventors: Thomas J. Long; Norbert J. Long; Michael J. Long; Jerry J. Long, all of Cleveland, Ohio

[73] Assignee: F.Y.L. Enterprises, Inc., Cleve, Ohio

[21] Appl. No.: 239,511

[22] Filed: May 9, 1994

[51] Int. Cl.⁶ ............................. H02B 1/40; A47F 13/06
[52] U.S. Cl. .................... 361/600; 248/224.7; 294/19.1; 361/679; 361/807; 361/809; 361/825
[58] Field of Search ............................. 248/224.1, 224.4, 248/225.1, 343; 294/19.1; 340/628, 693; 174/50, 52.1, 53, 54; 361/600, 679, 725, 728, 747, 807, 809, 825; 81/177.1; 403/229

[56] References Cited

U.S. PATENT DOCUMENTS

| | | | |
|---|---|---|---|
| 1,453,233 | 4/1923 | Ball, Jr. . | |
| 1,728,515 | 9/1929 | Sullivan . | |
| 2,055,698 | 9/1936 | Mulcahy | 268/134 |
| 3,574,381 | 4/1971 | Ocheltree et al. | 294/19 |
| 3,900,795 | 8/1975 | Larsen et al. | 324/158 R |
| 4,032,707 | 6/1977 | Trenary | 174/52.1 |
| 4,074,341 | 2/1978 | Hiederost et al. | 361/600 |
| 5,009,384 | 4/1991 | Gerke et al. | 248/343 |
| 5,060,995 | 10/1991 | Goldstein et al. | 294/19.1 |
| 5,281,954 | 1/1994 | Harrison et al. | 340/628 |
| 5,314,221 | 5/1994 | Hammer | 294/19.1 |

FOREIGN PATENT DOCUMENTS

| 4215978 | 11/1993 | Germany | 248/225.1 |

*Primary Examiner*—Donald A. Sparks
*Attorney, Agent, or Firm*—Renner, Otto, Boisselle & Sklar

[57] ABSTRACT

A smoke detector or alarm includes on its lower side a cylindrical cup which may be lined with ribbed foam rubber. The inside diameter formed by the liner is designed to mate with the end of a broom or mop handle so that the cup forms a reasonably firm fitting socket for the handle end. A wedge shape triangular adapter plate is mounted on top of the smoke detector and slightly spaced from the top by a round vertical stud. Secured either directly to the ceiling or to the usual smoke detector mounting fasteners is a receiver into which the adapter plate fits. The receiver is in the form of a horizontal wedge shape triangular slot, the bottom of which has a blind slot to accommodate the stud of the adaptor. The bottom of the entrance to the receiver is provided with a lip over which the adapter plate must move. The smoke alarm may accordingly be readily removed and replaced for battery changing, servicing, and testing without the use of a step ladder or step stool. The adapter, receiver and cup form the major components of a kit which may be applied to new or existing smoke detectors.

15 Claims, 2 Drawing Sheets

5,563,766

MOUNTING ASSEMBLY FOR A SMOKE ALARM

DISCLOSURE

This invention relates generally as indicated to a smoke alarm and more particularly to a ceiling mounted smoke detector or alarm which can be removed and replaced without resort to a step ladder, step stool, or complex tools.

BACKGROUND OF THE INVENTION

Most smoke alarms are mounted on a ceiling, and, unfortunately, just out of reach. In most smoke alarms, it is recommended that batteries be changed every six months and that the units be frequently tested. This usually requires that someone climb up on a step ladder or step stool, which is always a nuisance, and such ladders or step stools are also frequent causes of accidents. As a result, the smoke alarm does not get serviced the way it should and may become inoperative.

Efforts to make battery replacement or servicing easier and without the use of step ladders or step stools may be seen in prior U.S. Pat. Nos. 5,281,954 and 3,900,795. Both use relatively complex pole mounted tools which are designed for special brackets or smoke detector configurations.

Accordingly, it would be desirable to be able to mount and dismount all or most existing smoke detectors without complex tools, and without a step ladder or step stool. It would also be desirable to be able to provide both new and existing smoke detectors with a simple, easy to assemble and install mounting kit to enable the smoke detector to be ceiling mounted and removed with a tool as simple as a broom or mop handle.

SUMMARY OF THE INVENTION

A smoke detector includes on its lower side a cylindrical cup which may be lined with foam rubber having annular ribs. The inside diameter formed by the liner is designed to mate with the end of a broom or mop handle so that the cup forms a reasonably firm fitting socket for the handle end. A wedge shape generally triangular adapter plate is mounted on top of the smoke detector and slightly spaced from the top by a round vertical stud. A receiver is secured directly to the ceiling or other elevated surface. The adapter plate fits into the receiver. The receiver is in the form of a horizontal wedge shape or triangular slot or pocket, the bottom of which has a blind slot to accommodate the stud of the adaptor. The triangular adapter plate and the triangular receiver are both isosceles and equilateral triangles and have the same apex angles. This assures that two equal sides are in linear engagement when the parts are nested holding the adapter and thus the smoke detector against movement in the direction of the apex, but also laterally of such direction. This enables the handle easily to be inserted or removed from the cup. The bottom of the entrance to the receiver pocket or slot is provided with a lip over which the adapter plate must move. The smoke alarm may accordingly be readily removed and replaced for battery changing, servicing, and testing without the use of a step ladder or step stool. The adapter, receiver and cup form the major components of a kit which may readily be applied to new or existing smoke detectors.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
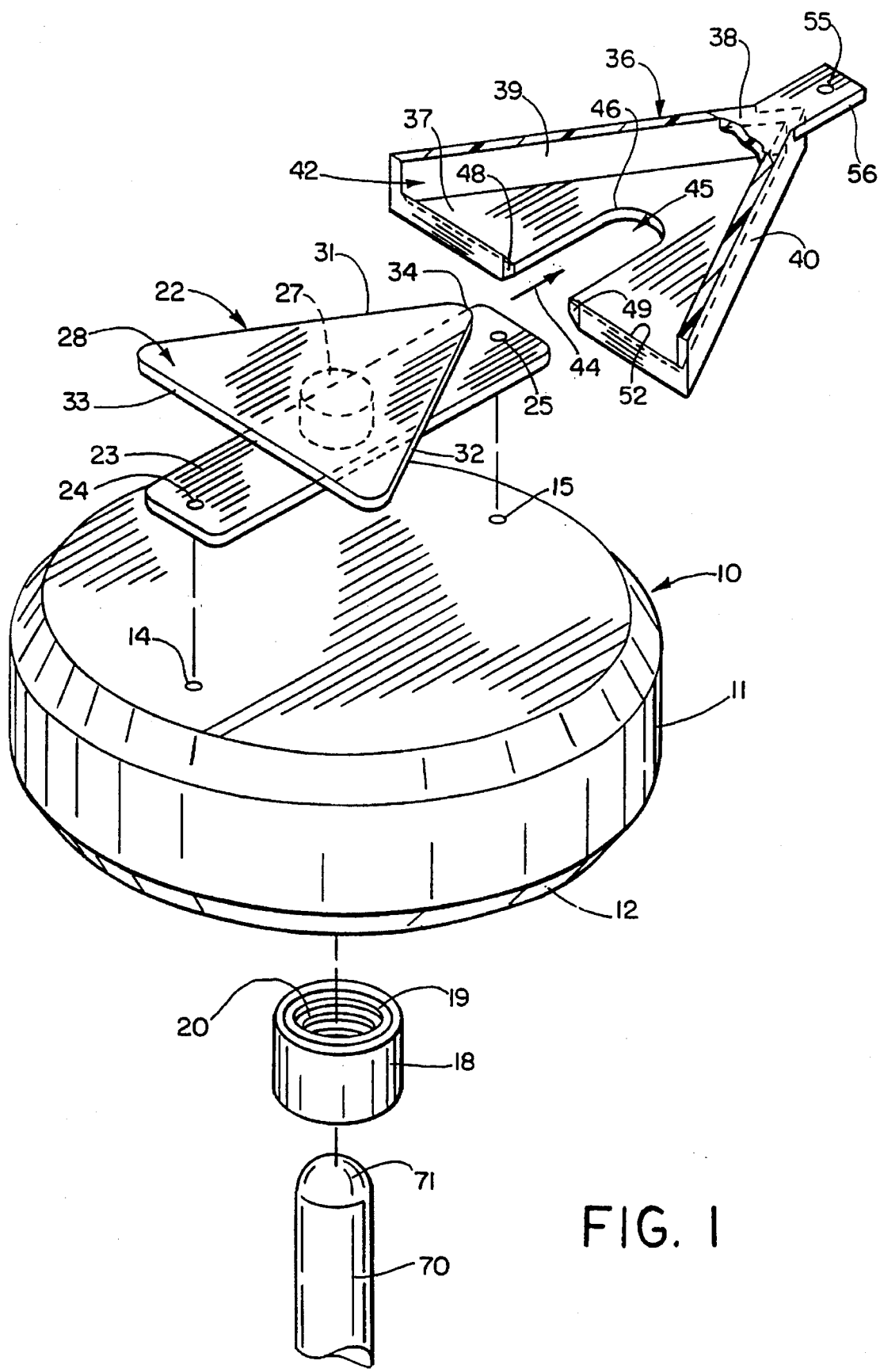
FIG. 1 is a perspective exploded view showing the receiver partially broken away; the adapter, the smoke detector, the cup, and the upper end of a broom or mop handle.

Referring now to the drawings and more particularly to FIG. 1, there is illustrated a smoke alarm shown generally at 10 which conventionally includes a circular housing 11 and a bottom 12 which may be hinged away from the housing or otherwise opened to permit access to the interior for servicing and battery changing, for example. The top of the smoke alarm 10 is provided with two fastener holes indicated at 14 and 15 which are approximately four inches apart, which dimension is generally standard on all makes of smoke detectors. The holes are designed to receive studs or fasteners to fit into a mating ceiling or wall bracket. It will be appreciated that terms such as "top", "bottom" and "horizontal" would apply to a normal ceiling mount, but that such detectors can also be mounted on walls near the ceiling.

Secured to the central of the bottom 12 is a cylindrical cup indicated at 18 which is provided with an internal liner 19 having axially spaced internal annular ribs 20. The cup may be fastened to the bottom of the smoke detector by any suitable means such as an instant adhesive. Both the bottom 12 of the smoke detector and the cup 18 may be a plastic material and there are many suitable adhesives for joining plastic to plastic.

Fastened to the top of the smoke detector by means of the holes 14 and 15 is an adapter shown generally at 22. The adapter comprises a lower rectangular plate 23 which is provided with holes 24 and 25 laterally centered, and one at each end. Projecting from the approximate middle of the plate 23 is a circular stud 27 which supports triangular plate 28 in spaced relation to the plate 23. The plate 28 is in the form of both an isosceles and equilateral triangle. The sides 31 and 32 and base 33 are of equal length and the corners are each provided with a radius as seen at 34. The circular stud is located in the center of plate 28.

The plate 28 is designed to mate with a receiver shown generally at 36. The receiver includes a bottom wall 37, a top wall 38, and angularly related side walls 39 and 40. The side walls 39 and 40 have the same included angle as the sides 31 and 32 of the plate 28. The enlarged end of the receiver is open as indicated at 42 to provide a horizontal triangular pocket to receive the plate 28. To accommodate the plate moving in the direction of the arrow 44, the bottom plate 37 is provided with a blind slot 45 which accommodates and captures the stud 27. The end of the slot is rounded as seen at 46 matching the radius of the stud and the corners at the opening of the slot are beveled as seen at 48 and 49.

Figure 4:
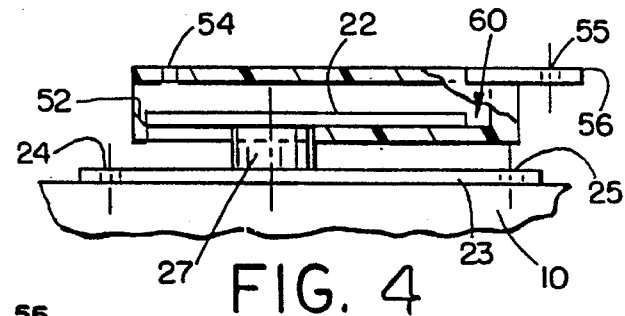
FIG. 4 is a side elevation of the receiver and adapter assembled with the receiver broken away.

The edge of the bottom plate 37 at the opening 42 is provided with a restricting beveled lip or edge seen at 52 so that when the plate is nested or seated in the receiver as seen in FIG. 4, it has to be lifted over the edge 52 to be removed through the pocket or opening 42.

Figure 3:
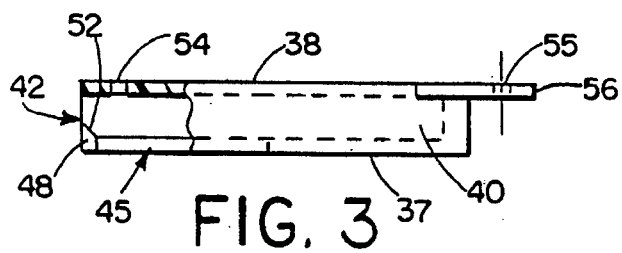
FIG. 3 is a side elevation of the receiver partially broken away.
Figure 2:
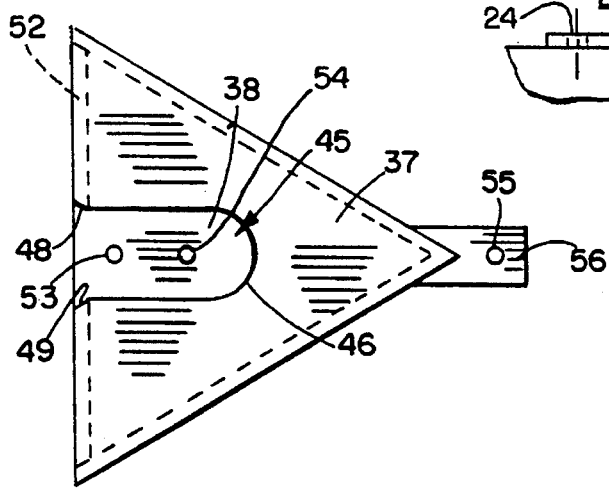
FIG. 2 is a bottom plan view of the receiver on a somewhat reduced scale.
Figure 5:
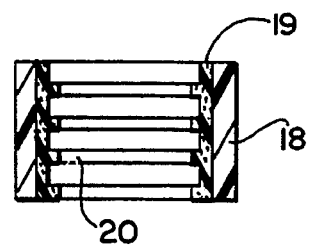
FIG. 5 is a diametrical section of the cup showing the ribbed foam rubber liner.

The upper plate 38 as seen more clearly in FIGS. 2 and 3 is provided with fastener holes 53, 54 and 55. The spacing of the holes 53 and 55 is the same as the holes 14 and 15, which is the standard spacing for the mounting holes. The spacing of the holes 54 and 55 is for the smaller mounting standard sometimes used. In order to achieve such spacing, the hole 55 is provided on a tab 56 projecting from the apex of the receiver. All three holes are exposed from the bottom of the receiver; the hole 55 because of the tab 56, and the holes 53 and 54 through the slot 45. The holes may be used with suitable fasteners to mount the receiver directly to the ceiling or wall or to the standard fasteners for the smoke alarm. Alternatively, the receiver may be secured to the ceiling or wall by other means such as by adhesive. In any event, the receiver is designed to be fixed to the ceiling or wall while the adapter may be inserted into and removed from the interior of the receiver.

When inserted as seen in FIG. 4, the apex of the plate 22 will be slightly spaced from the interior apex of the receiver as indicated at 60. This is because of the radius 34 even though the legs or edges 31 and 32 are in linear abutment with the walls 39 and 40, respectively. Thus when the adapter is inserted into the receiver, the adapter and of course the smoke alarm supported thereby will be restrained against further movement in the direction of the arrow 44 and also against lateral movement in either direction. This then enables a tool such as seen at 70 in FIG. 1 to be inserted into the cup 18.

The tool 70 is in the form of a mop or broom handle and has a rounded end 71 which snugly fits into the cup 18. The foam rubber ribs lining the interior of the cup grip the tool 70 and enable the manipulator from below readily to lift the smoke alarm including the adapter on top and move the same horizontally out of the entrance 42 in the receiver pocket. In this manner, the entire smoke alarm may readily be brought to a height where the batteries may more conveniently be replaced or the smoke alarm tested or serviced. With the servicing completed, the smoke alarm may be placed back on top of the rounded tool handle end 71 and readily inserted back into the receiver simply by elevating the smoke alarm and causing the adapter plate to enter the receiver in the direction of the arrow 44 until properly seated as seen in FIG. 4. At such point, a slight angular movement of the tool 70, or with slight twisting, if necessary, will remove the tool 70 from the cup 18 leaving the smoke alarm with the adapter properly seated in and supported by the receiver. It is noted that because the plate is equilateral, it may be inserted in the receiver pocket in any of three general directions with the final alignment being obtained when the edges engage the walls. If the receiver is mounted on a wall, the mouth 42 should be up.

It will be appreciated that the adapter, receiver, and cup form three elements of a kit which may readily be assembled to existing or new smoke alarms to make the mounting and retrieval of the smoke alarm to and from the ceiling height to be sufficiently simple and easy, that there is no proper excuse for not doing the required periodic battery replacement, servicing, or testing. The adapter, receiver, and cup are designed to fit all standard smoke detectors.

It can now be seen that there is provided a smoke detector which can be mounted on and removed from elevated positions by simple manipulation of a simple tool such as the handle of a mop or broom. It can also be seen that there is provided a kit for mounting a smoke detector to a ceiling or like elevated surface which comprises a cup adapted to be secured to the bottom of the smoke detector, an adapter adapted to be secured to the top of the smoke detector, and a receiver adapted to be secured to a ceiling and having a pocket which receives the adapter when the smoke detector is manipulated by handle type tool inserted in the cup.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What we claim is:

1. A smoke detector comprising a main housing containing the battery and alarm, said housing having a bottom surface, a cup secured to said bottom surface and opening downwardly, an adapter mounted on top of said housing and including a horizontal plate, and a receiver adapted to be mounted on a ceiling, said receiver including a slot adapted to receive said plate, whereby a handle may be inserted in said cup, and used to remove said plate from said slot so that the smoke detector may conveniently be removed from the ceiling for battery replacement or servicing.

2. A smoke detector as set forth in claim 1 wherein said adapter and receiver mate to support said detector against horizontal movement.

3. A smoke detector as set forth in claim 2 wherein said adapter includes an elevated triangular plate, and said receiver includes a triangular pocket, the joining walls of the pocket being at the same angle as two of the edges of said plate.

4. A smoke detector as set forth in claim 3 including a lip along the lower edge of the opening of the pocket, said plate nesting within the lip.

5. A smoke detector as set forth in claim 3 including a stud supporting said plate above said housing, and a blind slot in the receiver to accommodate and capture said stud.

6. A smoke detector as set forth in claim 5 including a mounting plate for said adapter for mounting said adapter on said housing, said mounting plate having spaced fastening holes and spaced fastening holes in said receiver of the same spacing.

7. A smoke detector as set forth in claim 1 including a lining in said cup to obtain a releasable friction grip with such handle.

8. A kit for mounting a smoke detector to a ceiling, a cup having a bottom opening adapted to be secured to the bottom of the smoke detector, an adaptor having a horizontal plate adapted to be secured to the top of the smoke detector, and a receiver adapted to be secured to a ceiling and having a horizontal slot adapted to receive said adaptor horizontal plate when the smoke detector is manipulated by a handle inserted in the bottom opening of the cup.

9. A kit as set forth in claim 8 wherein said adapter and receiver mate to support said detector against horizontal movement.

10. A kit as set forth in claim 9 wherein said adapter includes an elevated triangular plate, and said receiver includes a triangular pocket, the joining walls of the pocket being at the same angle as two of the edges of said plate.

11. A kit as set forth in claim 10 including a lip along the lower edge of the opening of the pocket, said plate nesting within the lip.

12. A kit as set forth in claim 10 including a stud supporting said plate above said housing, and a blind slot in the receiver to accommodate and capture said stud.

13. A kit as set forth in claim 12 including a mounting plate for said adapter for mounting said adapter on said housing, said mounting plate having spaced fastening holes and spaced fastening holes in said receiver of the same spacing.

14. A kit as set forth in claim 8 including a lining in said cup to obtain a releasable friction grip with such handle.

15. A kit as set forth in claim 14 wherein said lining is foam rubber with annular inwardly projecting ridges.

* * * * *